United States Patent [19]

Hisano et al.

[11] Patent Number: 4,703,344

[45] Date of Patent: Oct. 27, 1987

[54] ILLUMINATION SYSTEM OF THE DIGITAL CONTROL TYPE

[75] Inventors: Atushi Hisano; Yoshinori Yamaguchi, both of Nagaokakyo; Toshimichi Masaki, Takatsuki; Kazuhiko Saka, Joyo; Nobuo Nakatsuka; Mitsutaka Kato, both of Kyoto, all of Japan

[73] Assignee: Omron Tateisi Electronics Co., Kyoto, Japan

[21] Appl. No.: 843,390

[22] Filed: Mar. 24, 1986

[30] Foreign Application Priority Data

Mar. 30, 1985 [JP] Japan .................................. 60-67996
Jun. 28, 1985 [JP] Japan .......................... 60-99852[U]
Jul. 11, 1985 [JP] Japan ................................ 60-153770

[51] Int. Cl.⁴ ........................ H04N 7/18; H04N 9/31
[52] U.S. Cl. ................................... 358/60; 358/93; 358/107; 358/237; 358/903; 901/47
[58] Field of Search ................. 358/10, 60, 61, 903, 358/93, 107, 237, 139; 901/47

[56] References Cited

U.S. PATENT DOCUMENTS

| | | | |
|---|---|---|---|
| 4,368,963 | 1/1983 | Stolov | 358/61 |
| 4,481,531 | 11/1984 | Warde | 358/60 |
| 4,488,173 | 12/1984 | Di Matteo | 358/903 |
| 4,593,309 | 6/1986 | Uno | 358/10 |
| 4,602,272 | 7/1986 | Duschl | 358/10 |
| 4,611,241 | 9/1986 | Albin | 358/60 |

Primary Examiner—Howard W. Britton
Attorney, Agent, or Firm—Stevens, Davis, Miller & Mosher

[57] ABSTRACT

A digital control color illumination system is disclosed for use in a visual system of an industrial robot or the like. This system comprises: image memories to store the color data regarding illumination patterns of three primary colors of red, green, and blue; video signal producing circuits each for reading out the data from the image memory and converting it to the video signal indicative of the illumination pattern; video projectors each for projecting the light of the illumination pattern represented by the video signal onto an object to be illuminated; and a color TV camera to pick up the object image. The image data picked up is processed by a computer system to produce the data which is stored into the image memories. With this illumination system, the scanning of the illumination patterns, and the change, adjustment, storage, and the like of the illumination patterns can be executed by software in accordance with programs preliminarily stored in the program memory in the computer system.

10 Claims, 20 Drawing Figures

IMAGE MEMORY

Fig.2B

ILLUMINATION AREA

ILLUMINATION SYSTEM OF THE DIGITAL CONTROL TYPE

BACKGROUND OF THE INVENTION

The present invention relates to an illumination system of the digital control type for use in, e.g., a visual system of an industrial robot or the like.

Hitherto, visual systems for use in industrial robots use various kinds of methods such as indirect illumination, slit light projection, spot light projection, lattice pattern projection, and the like for the purposes of improvement of contrast between an object to be illuminated and the background, emphasis of edges of the object, detection of irregularity of the surface of object, and the like. However, according to those methods, each time the observation circumstances change, the intensity, position, direction, and pattern of the illumination, and the like must be manually or mechanically adjusted. Thus, there are the problems such that it takes a long time to adjust them and the reproducibility of the optimum illuminating conditions is very bad. Further, in the case of scanning a slight light or spot light, the use of mechanical movable parts such as a rotary mirror and the like are inevitable, so that there are the problems such that not only the scanning speed is limited but also the vibrations of the movable parts adversely influence on the scanning, and the like.

SUMMARY OF THE INVENTION

It is an object of the present invention to provide an illumination system of the digital control type which can execute the scanning of the illumination pattern, and change, adjust, store, and the like, the illumination pattern by way of software, thereby fully eliminating the problems of the scanning speed, vibration, adjustment and the reproducibility of the illumination pattern, and the like of the conventional technology.

According to the present invention, an illumination system of the digital control type comprises: an image memory for storing the data regarding a predetermined illumination pattern; video signal producing means for reading out the data from the image memory and converting them into a video signal representative of the illumination pattern; and the light irradiating means for irradiating the light of the illumination pattern represented by the video signal to an object to be illuminated.

When color illumination is performed, the data regarding the illumination pattern of each color component of the color illumination light is stored into the image memory, respectively, for each of the color components, e.g., three primary colors. The video signal is produced for each color component. The illumination pattern light of each color component is projected from the light irradiating means. The lights of the color components projected are synthesized and irradiated onto the object.

According to the present invention, an arbitrary illumination pattern can be formed in the image memory and the illumination pattern formed can be also moved in the image memory under control of a computer. Therefore, the illumination pattern can be scanned without using any mechanical movable part and the foregoing various problems which are caused due to the presence of the movable parts can be solved. Various kinds of specifications of the illumination light, such as the shape, size, brightness, etc. of the illumination pattern which are required by the industrial visual system can be easily set and controlled by software. Also, the illumination pattern can be stored or reproduced at a high speed with a high degree of fidelity.

BRIEF DESCRIPTION OF THE DRAWINGS

FIGS. 6, 7A, 7B, 7C, 8A and 8B show an example of application of the present invention suitable to emphasize the contrast between the object and the background, in which

FIGS. 15 and 16 show a system which performs the color illumination and color image pickup in a time-sharing manner, in which

DESCRIPTION OF THE PREFERRED EMBODIMENTS

Figure 1:
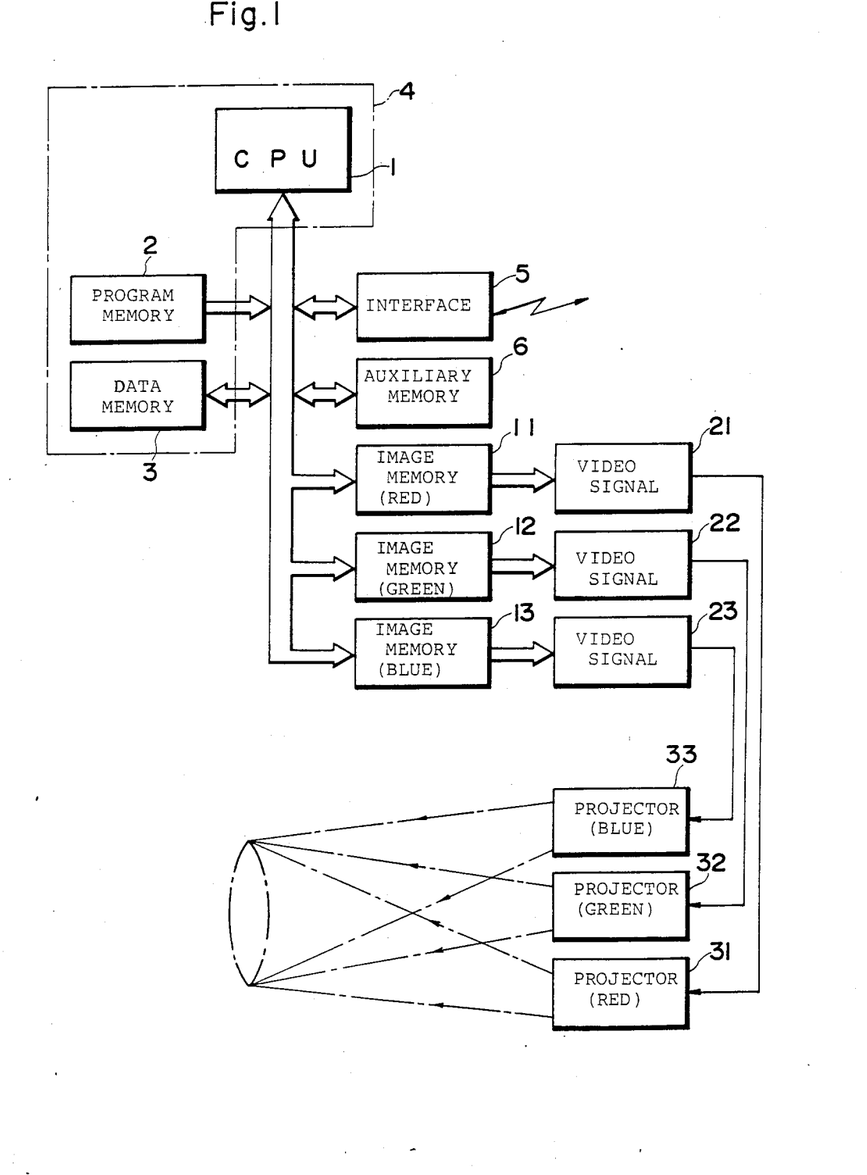
FIG. 1 is a block diagram showing the outline of an electrical arrangement of an illumination system of the digital control type according to the present invention.

FIG. 1 shows an outline of an electrical arrangement of an illumination system of the digital control type.

This illumination system is controlled by a computer system 4 comprising: a central processing unit (CPU) 1; a program memory 2 in which programs necessary to control the illumination are stored; and a data memory 3. An interface 5, which is connected to ther external apparatus such as, e.g., a control system of a robot or the like, and an auxiliary memory 6 are also connected to the computer system 4 through a bus including an address bus, a control bus, and a data bus.

The illumination system can perform the color illumination and is provided with image memories 11, 12, and 13 to respectively store the data regarding illumination patterns of the respective color components of three primary colors, i.e., red, green, and blue serving as fundamental colors to synthesize an arbitrary color. The image memories 11 to 13 are also connected to the CPU 1 through the bus. The CPU 1 can directly access the image memories 11 to 13 and control the writing or storing of image patterns (illumination patterns) into the image memories, production and movement of the illumination patterns in the image memories, and readout of the data indicative of the illumination patterns from the image memories. Consequently, the production of an arbitrary illumination pattern, setting of the size, brightness, position, and the like of this pattern, and scanning thereof can be freely executed in accordance with programs (software) of the CPU 1.

The data regarding the illumination patterns read out from the image memories 11 to 13 are sent to video signal producing circuits 21, 22, and 23, from which the video signals representative of the illumination patterns are outputted, respectively.

The video signals indicative of the red, green, and blue illumination patterns produced are sent to video projectors 31, 32, and 33, respectively. Thus, the lights corresponding to the red, green, and blue illumination patterns are projected from the video projectors 31 to 33 toward an object to be illuminated. A video projector receives the video signal and outputs the image projection light representative of this video signal. In the case of the color video projector, it is constituted by three high luminance tubes (Cathode Ray Tubes), three sets of lenses disposed in front of those tubes, and a video signal processor to control the high liminance tubes. FIG. 1 conveniently shows the arrangement on the assumption that the video projector is provided for each color component of three primary colors. The lights generated from the video projectors 31 to 33 are synthesized in the space between the projectors and the object to be illuminated, so that the object is illuminated by the synthesized color illumination pattern.

Figure 2A:
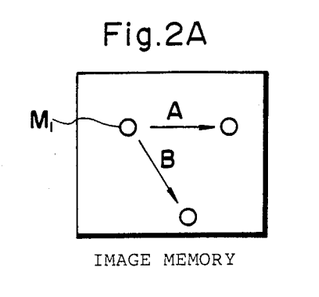
FIGS. 2A and 2B show the relation between the image pattern for illumination in an image memory and the illumination pattern in the illumination area formed using the image pattern.
Figure 2B:
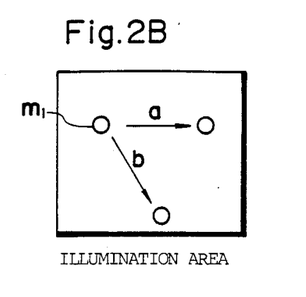

FIGS. 2A and 2B show the relation between the illumination pattern (image pattern) in the image memory (FIG. 2A) and the illumination pattern projected using the data of the image pattern in the illumination area (FIG. 2B). In the case where an image $M_1$ to cause the spot-like illumination pattern to be generated is stored in the image memory, a spot illumination light $m_1$ is projected into the illumination area in correspondence to the image $M_1$. When the image $M_1$ is moved in the direction indicated by an arrow A in the image memory due to the control of the CPU 1, the spot light $m_1$ in the illumination area is to also moved in the direction indicated by an arrow a. The movement of the image $M_1$ in the image memory is realized by, for example, erasing the data at the original position and then writing the data of the image $M_1$ at a new position. It will be obviously understood that when the image $M_1$ in the image memory is moved in the direction indicated by an arrow B different from the arrow A, on the other hand, the spot light $m_1$ in the illumination area is also moved in the direction indicated by an arrow b in correspondence to the arrow B.

Figure 3:
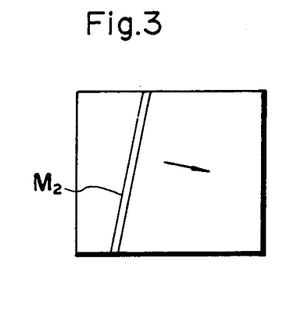
FIGS. 3, 4, and 5 show other examples of the image in the image memory.

FIG. 3 shows an image $M_2$ for another illumination pattern stored in the image memory. It will be easily appreciated that the slit-like illumination light is irradiated into the illumination area due to the image $M_2$ and when the image $M_2$ is moved in the direction indicated by an arrow in the image memory, the slit-like illumination pattern in the illumination area is also moved in the direction corresponding to this arrow.

Figure 4:
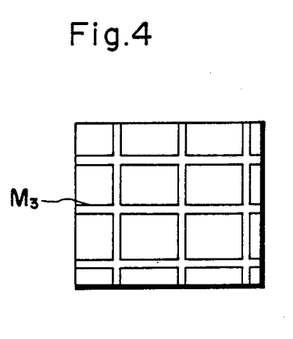
Figure 5:
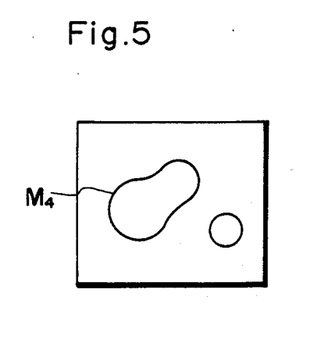

Further, if a lattice image pattern $M_3$ as shown in FIG. 4 is produced in the image memory, a similar lattice illumination pattern is also formed in the illumination area. On the other hand, if an image pattern $M_4$ of a figure as shown in FIG. 5 is formed in the image memory, an illumination pattern of a similar figure is also formed in the illumination area. The enlargement, reduction, rotation, parallel movement, and the like of various kinds of patterns can be freely executed due to the softwares. The data indicative of the image patterns can be stored as files into the auxiliary memory 6 in FIG. 1 and read out and reproduced therefrom at any time.

Figure 6:
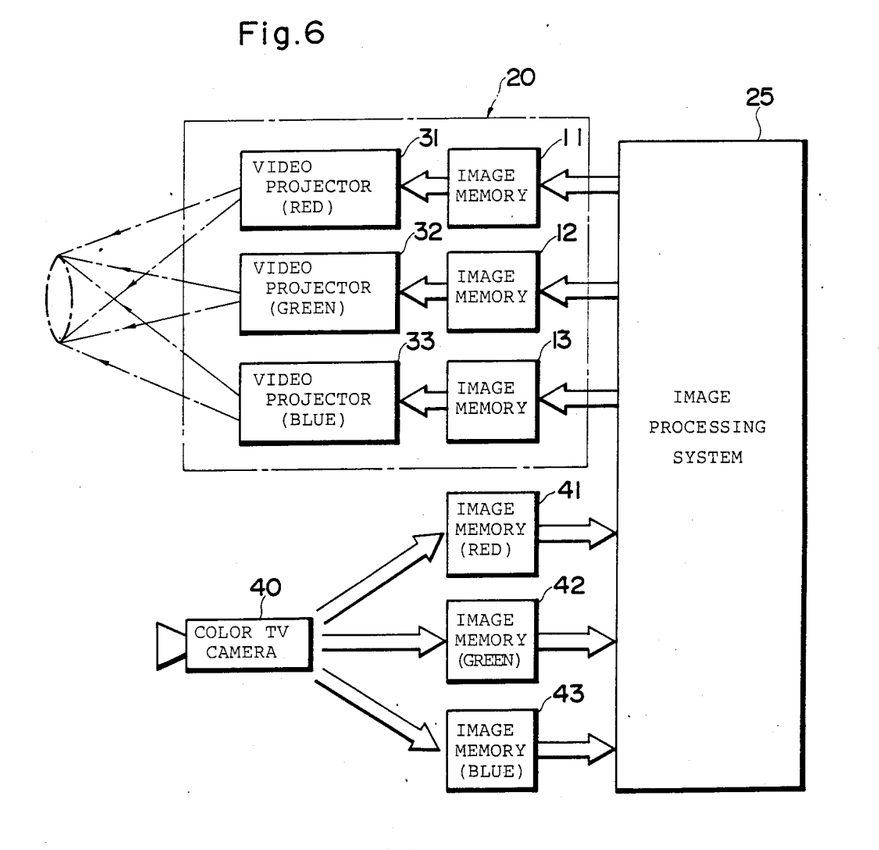
FIG. 6 is a block diagram.
Figure 7A:
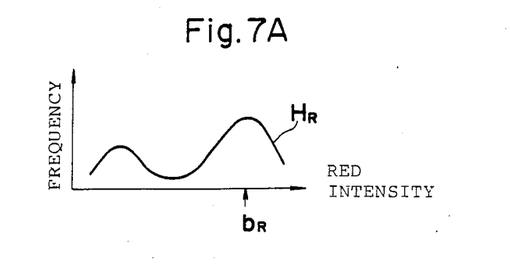
FIGS. 7A to 7C are graphs showing the histograms.
Figure 7B:
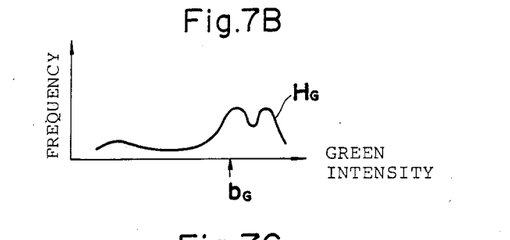
Figure 7C:
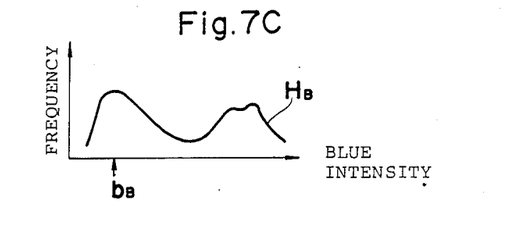
Figure 8A:
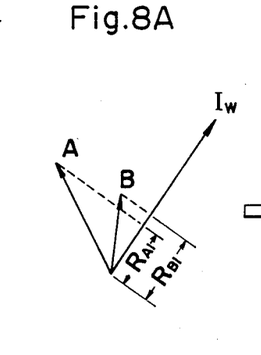
FIGS. 8A and 8B are color vector diagrams.
Figure 8B:
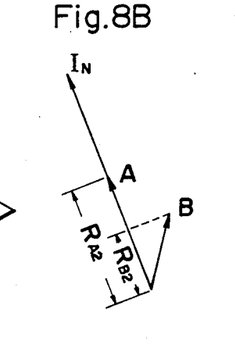

FIGS. 6 to 8 show an example of application of the illumination system of the digital control type described above. This example is suitable to perform the illumination having the emphasized contrast between the object and the background.

In FIG. 6, the same parts and components at those shown in FIG. 1 are designated by the same reference numerals. An illuminating unit 20 has a constitution similar to the illumination system shown in FIG. 1 exclusing that the computer system 4 was removed therefrom. The video signal producing circuits are not shown in FIG. 6 for simplicity of the drawing.

In the initial step, the illumination data such that the lights projected from the video projectors 31 to 33 are synthesized to produce white light $I_W$ is stored in the image memories 11 to 13. All of the pixel data in the respective image memories are equally set so as to project the uniform lights.

The lights reflected from the surface of the object illuminated by the white light are picked up by a color television camera 40. The video signal is produced by the camera 40 and separated into three video signals corresponding three primary colors. The data indicative of the video signals of the respective colors is stored into image memories 41, 42, and 43.

An image processing system 25 includes a CPU, a program memory, a data memory, and the like and executes the following analyzing processes of the image data of the object stored in the image memories 41 to 43. Then, the image processing system 25 set new data into the image memories 11 to 13.

The image processing system 25 first produces histograms $H_R$, $H_G$, and $H_B$ regarding the brightnesses of the image data of red, green, and blue as three primary colors of the object which has been stored in the image memories 41 to 43. FIGS. 7A to 7C show examples of the histograms of the brightnesses of the object with respect to three primary colors. In each graph, an axis of abscissa denotes an intensity (brightness) and an axis of ordinate represents a frequency (number of pixels having same brightness). In the next step, the intensities $b_R$, $b_G$, and $b_B$ each having the maximum frequency (peak value) are obtained from these histograms. The representative vectors ($r_R$, $r_G$, $r_B$) indicative of the colors of the object are calculated using the values of intensities $b_R$, $b_G$, and $b_B$ by the following expressions.

$$r_R = b_R/(b_R^2 + b_G^2 + b_B^2)^{\frac{1}{2}}$$

$$r_G = b_G/(b_R^2 + b_G^2 + b_B^2)^{\frac{1}{2}}$$

$$r_B = b_B/(b_R^2 + b_G^2 + b_B^2)^{\frac{1}{2}}$$

The data indicative of the values $I_R = r_R \cdot I$, $I_G = r_G \cdot I$, and $I_B = r_B \cdot I$ (I is a constant) proportional to the resultant representative vectors $r_R$, $R_G$, and $r_B$ are set into the image memories 11, 12, and 13 of the illuminating unit 20, respectively. In each image memory, the data of the same value is set with regard to all pixels.

The lights are projected to the object from the video projectors 31 to 33 on the basis of the data newly set into the image memories 11 to 13. The color of the synthesized light $I_N$ of the projected lights from the projectors 31 to 33 is substantially the same as that of the surface of the object. Namely, since the light having almost the same color as that of the surface of the object is projected, the contrast between the object and the background is enhanced.

The principle of the emphasis of the contrast will then be described with reference to FIGS. 8A and 8B. FIG. 8A shows a vector diagram when the white light $I_W$ was projected. FIG. 8B shows a vector diagram when the light $I_N$ having almost the same color as that of the surface of the object was projected. In the diagrams, reference characters A and B denote vectors indicative of the colors of the object and background, respectively. It can be seen from FIG. 8A that there is the small difference between the intensity $R_{A1}$ of reflected lights from the object and the intensity $R_{B1}$ of reflected lights from the background when the while light $I_W$ was projected. On the other hand, as shown in FIG. 8B, there is the large difference between the reflected light intensity $R_{A2}$ from the object and the reflected light intensity $R_{B2}$ from the background when the light $I_N$ having substantially the same color as that of the surface of the object was projected. Thus, it will be understood that the contrast between the object and the background is emphasized in FIG. 8B.

Figure 9:
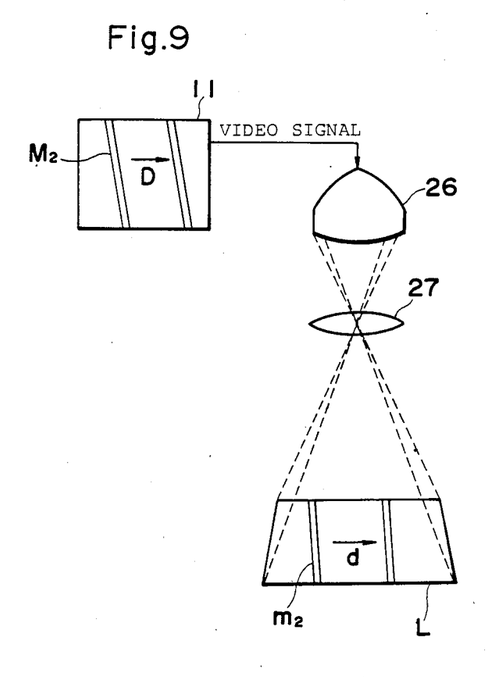
FIG. 9 is a schematic constitutional diagram showing an example of application of the present invention adapted to scan a slit-like projection light.

FIG. 9 shows another example of application of an illumination system according to the present invention.

The system shown in this diagram is constituted as follows. The slit-like image pattern $M_2$ in the image memory (e.g., 11) is moved in the direction indicated by an arrow D in the diagram. This image pattern is converted to the video signal and supplied to a CRT display device 26. The slit-like illumination pattern $m_2$ is formed in an illumination area L by the CRT 26 through a lens 27. This illumination pattern is moved in the direction indicated by an arrow d in the diagram. The scanning of the slit-like illumination pattern is frequently requested in the three-dimensional object sensing or recognizing system. According to the present invention, the scanner without having any movable part can be realized and the width and direction of the illumination pattern $m_2$ can be freely changed due to the softwares.

Returning to the system shown in FIG. 6, the illuminating unit 20 has the video projectors 31 to 33 and the illumination lights are projected from these video projectors to the object. Each video projector uses an electron beam which is vertically and horizontally scanned in order to output an image in a manner similar to a television system. Therefore, even if an illumination pattern such as to uniformly illuminate the illumination area was given, the illumination pattern includes both the bright and dark portions in the illumination area when it is momentarily observed. On the other hand, the TV camera 40 also converts the two-dimensional image to a serial video signal due to the vertical and horizontal scans.

Consequently, unless the light projection timing and the image pickup timing are synchronized, the problem such that a fringe extending the lateral direction appears in the image picked up is caused. In addition, if there is a slight deviation between the synchronizing frequency of the video projector and that of the TV camera 40, the above-mentioned fringe moves in the vertical direction on the CRT screen.

Figure 10:
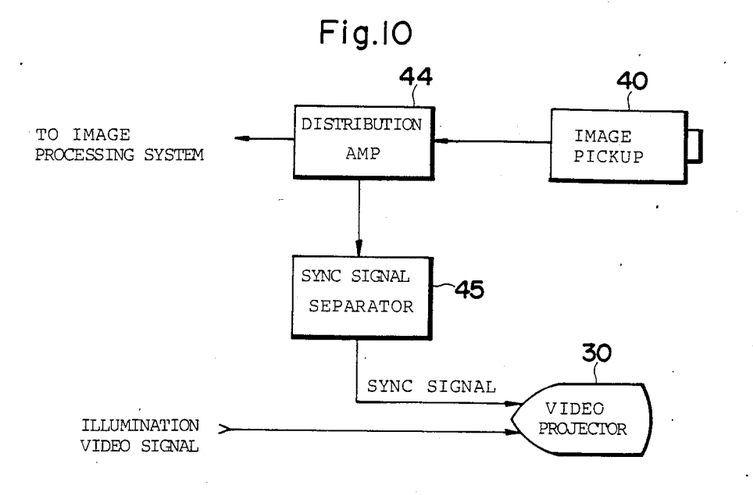
FIG. 10 is a block diagram showing an example of a construction in which a video projector is synchronized with an image pickup device.

FIG. 10 shows an example of an arrangement to solve such a problem. A video projector is indicated at numeral 30 in this diagram. The video projector 30 may be used for either the color illumination or the monochromatic illumination.

The illumination video signal read out from the image memory and converted to the video signal is supplied to the video projector 30. A synchronizing signal is also suplied to the video projector 30 from a sync signal separating circuit 45, thereby allowing the video signal to be synchronized with this sync signal.

On the other hand, the video signal outputted from the image pickup device 40 is sent to a distribution amplifier 44, by which it is divided into two video signals. One of them is supplied to an image processing apparatus (e.g., system 25 in FIG. 6) and the other is supplied to the sync signal separating circuit 45, respectively. The separating circuit 45 separates the sync signal from the image video signal received and sends it to the video projector 30 as mentioned above.

As described above, the scanning timing by the video projector 30 serving as the illuminating means is completely synchronized with the scanning timing by the image pickup device 40, so that the occurrence of fringe in the image picked up is prevented and the clear image can be always obtained. Therefore, the image process can be performed in the image processing system as well with a high degree of precision.

The sync signal may be also separated from the illumination video signal which is given to the video projector 30 and then supplied to the image pickup device 40.

Figure 11:
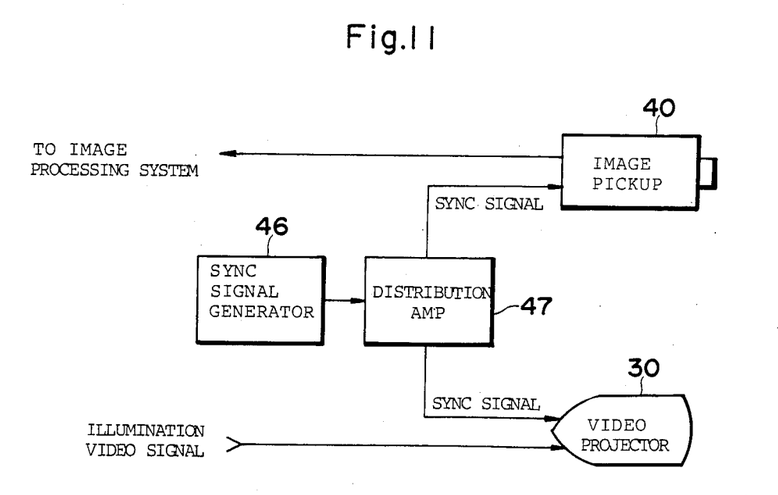
FIG. 11 is a block diagram showing another example similar to the construction shown in FIG. 10.

As shown in FIG. 11, in addition, a sync signal which is generated from a sync signal generator 46, which is separately provided, may be also distributed to the video projector 30 and image pickup device 40 by a distribution amplifier 47.

Figure 12:
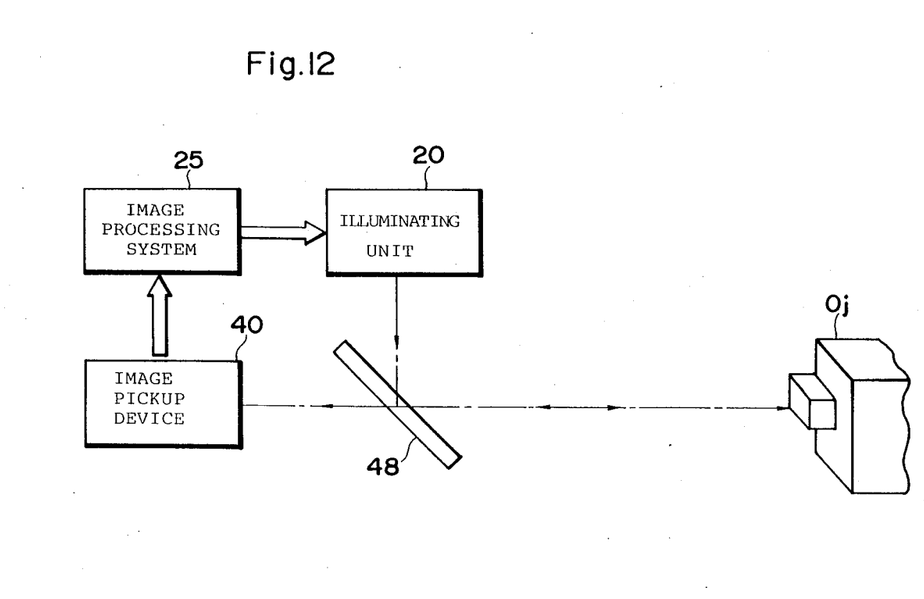
FIG. 12 is a diagram showing an example in which the optical axis of the illumination light from an illumination unit coincides with the optical axis of an image pickup device.

FIG. 12 shows an example of application in which the optical axis of the illumination light which is projected from the illuminating unit 20 to an object $O_j$ coincides with the optical axis of the image pickup device 40 to pick up the image of the object $O_j$.

It is obviously desirable that the projecting direction of the illumination light and the image pickup direction are the same in the example of application to emphasize the contrast between the object and the background described in conjunction with the FIGS. 6 to 8. In the case of selectively locally illuminating only the special region of the object, e.g., the most characteristic portion, the position of the special region must be accurately detected. In such a case, by making the optical axis of the apparatus to pick up the object image coincident with the optical axis of the illuminating unit to project the spot light, the coordinates of the special region on the image picked up can be directly used by the illuminating unit as the data indicative of the illuminating position of the spot light, so that this method is fairly convenient.

Referring again to FIG. 12, a half mirror 48 is arranged on the optical axis connecting the image pickup device 40 and object $O_j$ at an angle of 45° with respect to the optical axis. The optical axis of the illuminating unit 20 is perpendicular to the optical axis connecting the image pickup device 40 and object $O_j$ and at the same time, the illuminating unit 20 is disposed at an angle of 45° with respect to the half mirror 48. Therefore, the optical axis of the illumination light irradiated from the illuminating unit 20 and deflected by the half mirror 48 coincides with the optical axis of the image pickup device 40.

In the arrangement of FIG. 12, the illumination light generated from the illuminating unit 20 is reflected by the half mirror 48 so that its progressing direction is deflected by 90° and then irradiated to the object $O_j$. The reflected light from the object $O_j$ passed through the half mirror 48 and enters the image pickup device 40, so that the image of the object $O_j$ is picked up.

In the case of irradiating the spot light to only the special region of the object $O_j$, the following processes are performed.

First, the image of the object $O_j$ is picked up by the image pickup device 40. The video signal indicative of the object $O_j$ is sent to the image processing system 25, so that the coordinates of the special region to which the spot light is irradiated are derived by the system 25. The spot-like image pattern is produced at the memory location corresponding to the coordinates of the special region in the image memory. By supplying the video signal indicative of the data in the image memory to the video projector, the spot light can be irradiated to the special region of the object $O_j$.

Each of the systems shown in FIGS. 1 and 6 intends to perform the color illumination and is provided with the video projectors 31, 32, and 33 to respectively project the lights of three primary collars, namely, red(R), green(G), and the blue(B). These three video projectors are arranged at different positions in the space, so that there is the problem such that the color deviation occurs in the illumination area or on the surface of the object. For instance, the color deviation occurs near the boundary of the spot light or slit light. Consequently, the region where the color deviation occurred doesn't correspond to the illuminated region nor the non-illuminated region, resulting in deterioration in resolution of the illumination. In addition, the ratio of angles of the incident lights of three primary colors differs in dependence on each position in the illumination area, so that the color tones of the illumination lights in the illumination are become uneven. This causes the objects to erroneously recognized.

Figure 13:
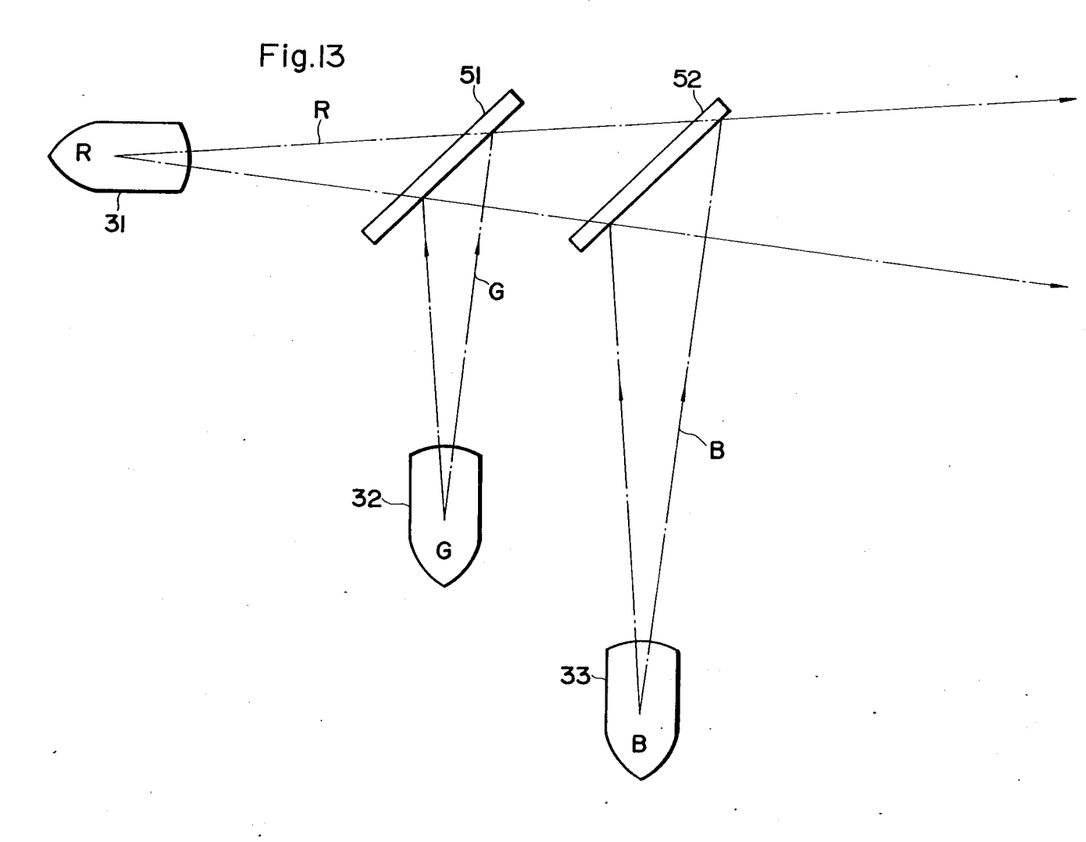
FIG. 13 is a diagram showing an arrangement of a system adapted to make the optical axes of the lights projected from three video projectors coincident with each other.

FIG. 13 shows a system intending to make coincident the optical axes of the illumination lights which are projected from a plurality of video projectors disposed at different positions. Two half mirrors 51 and 52 are arranged at a proper distance on the optical axis of, e.g., the video projector 31 of red so as to have an angle of almost 45° with respect to this optical axis, respectively. The outer two video projectors 32 and 33 are arranged in a manner such that the green and blue lights which are projected therefrom are directed toward the half mirrors 51 and 52 and at the same time these lights can cross the optical axis of the projector 31 at an angle of nearly 90°, respectively.

With this arrangement, the optical axis of the red light transmitted through the half mirrors 51 and 52, green light reflected by the half mirror 51 and transmitted through the half mirror 52, and blue light reflected by the half mirror 52 completely coincide with each other. Consequently, it is possible to realize a coaxial illumination as if the lights of three primary colors were irradiated from a single light source. The problems such as the color deviation and unevenness of the color tones depending on the locations mentioned above are solved.

The radio of the output light intensities of three video projectors 31 to 33 is determined in consideration of the transmission factors and reflection factors of the half mirrors 51 and 52 and may be set such that the radio of the light intensities of three primary colors on the right side of the half mirror 52 in FIG. 13 becomes a predetermined value. It is apparent that a focusing optical system may be also arranged on the right side of the half mirror 52.

The number of video projectors in which the optical axes of their output lights are made coincident with each other can be set to an arbitrary value. To make the optical axes of the output lights on n video projectors coincident, (n−1) half mirrors are used.

Figure 14:
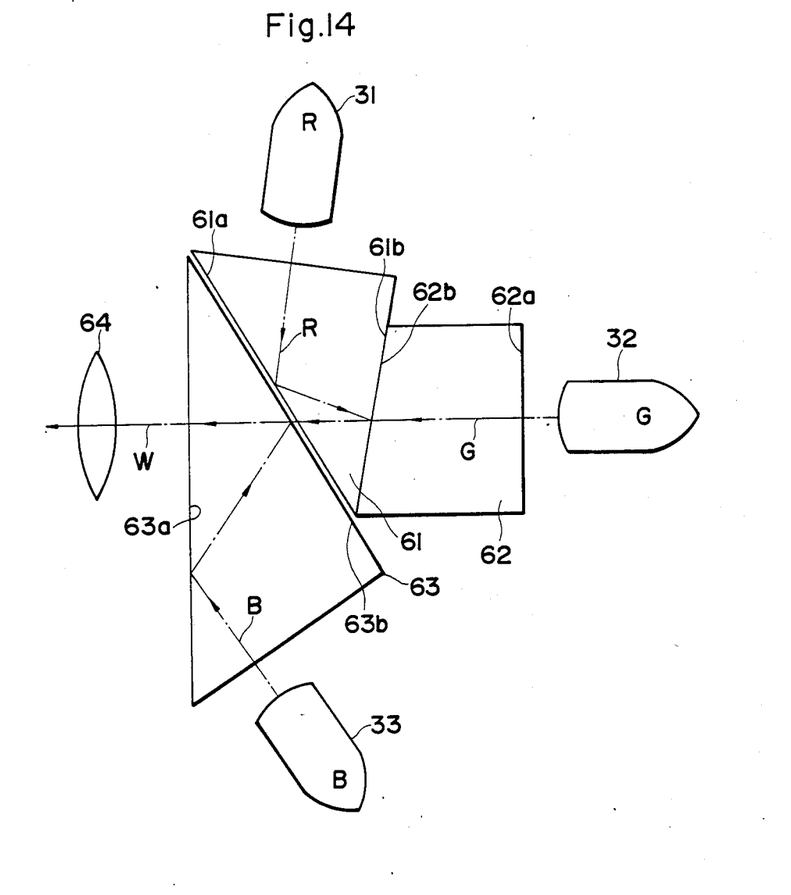
FIG. 14 is a diagram showing another example of a system suitable to make the optical axes of a plurality of projected lights coincident with each other.

FIG. 14 shows another example of a system to make coincident the optical axes of a plurality of illumination lights. Three prisms 61, 62, and 63 are used as means for deflecting the lights.

The optical axis of the video projector 32 which projects the green illumination light is used as the reference axis. In other words, the optical axis of the projector 32 coincides with an optical axis W of the synthesized light. The green illumination light from the video projector 32 passes through two surfaces 62a and 62b of the prism 62 and further passes through surfaces 61a and 61b of the prism 16 and through surfaces 63a and 63b of the prism 63 and enters a focusing lens 64. Since the angle between the normal line of the surface 61a of the prism 61 and the green light is relatively small, no total reflection occurs on this surface. The same shall apply to the cases of the surface 62b of the prism 62 and the surface 63a of the prism 63.

The red illumination light projected from the video projector 31 is totally reflected by the surfaces 61a of the prism 61 and progresses toward the surface 61b. An interference film adapted to reflect the red light having the special angle of incidence has been formed on the surface 61b, so that the red light is reflected by the surface 61b and progresses along the same axis as the optical axis W of the synthesized light.

The blue light projected from the video projector 33 is totally reflected by the surface 63a of the prism 63 and progresses toward the surface 63b. Since an interference film adapted to reflect the blue light having the special angle of incidence has been formed on the surface 63b, the blue light is reflected by the surface 63b and progresses along the same axis as the optical axis W of the synthesized light.

In this manner, the lights of three primary colors whose optical axes were made coincident are converted by the lens 64 and irradiated into the illumination area or to the object.

Figure 15:
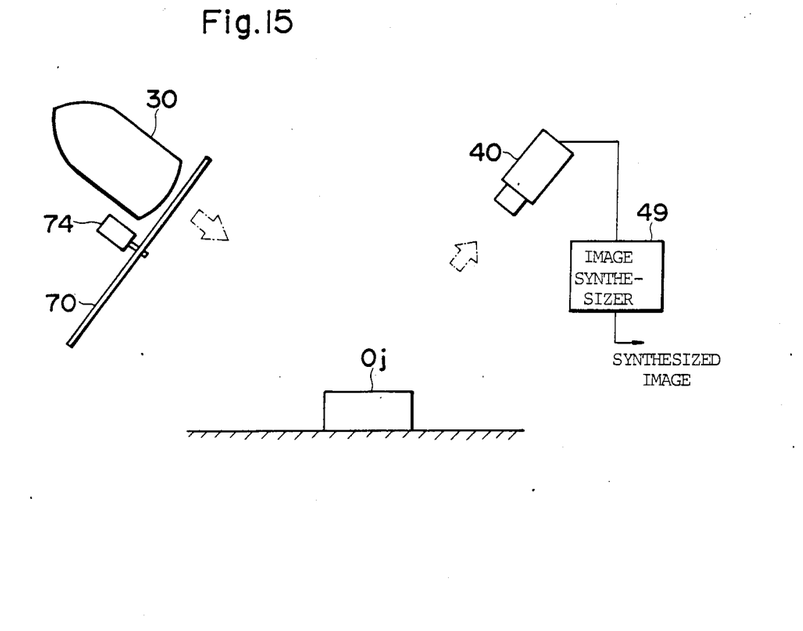
FIG. 15 shows a whole arrangement and FIG. 16 is a front view of a rotary plate.

FIG. 15 shows an example of a system which time-sharingly irradiates the illumination lights of three primary colors to the object and also time-sharingly picks up the image of the object for every color.

Figure 16:
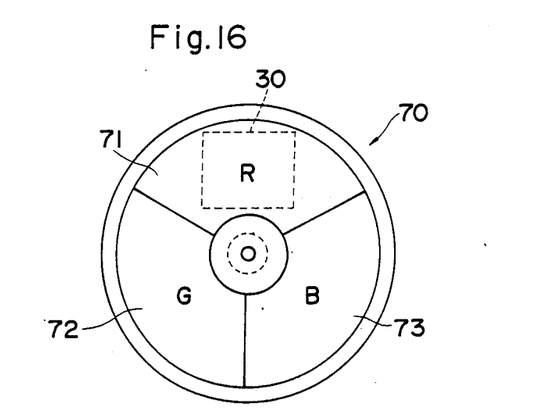

This system is constituted such that a rotary plate 70 which is rotated by a drive motor 74 is disposed in front of the light projecting surface of the monochromatic video projector 30. As shown in FIG. 16, the rotary plate 70 is composed of a red filter 71, a green filter 72, and a blue filter 73 which are arranged at regular angles. When the image generated from the video projector 30 passes through the filter, the color image of the color corresponding to this filter is produced and projected. The video signals of the monochromatic images regarding three primary colors (red, green, blue) are supplied to the video projector 30. The monochromatic video projector 30 and the drive motor 74 are synchronized with each other in a manner such that each time the filters 71 to 73 of red, green and blue are sequentially located in front of the video projector 30, the monochromatic image of the color corresponding to the filter is projected. For example, the rotating speed of the drive motor 74 is set to about ten rotations per second.

The color TV camera 40 picks up the image of the object $O_j$ three times every time the drive motor 74 once rotates, obtains respective images of three primary colors, synthesizes these three images by an image synthesizer 49, and thereby derives one color image.

The monochromatic images of three primary colors are projected onto the object $O_j$ through the filters 71 to 73 by the monochromatic video projector 30 in synchronism with the rotation of the rotary plate 70. Thus, the coaxial illumination of the color images of three primary colors can be realized and it is possible to perform the image processes in which no color deviation occurs and the resolution doesn't deteriorate.

We claim:

1. A digital control illumination system comprising:
    an image memory for storing data regarding a predetermined illumination pattern;
    video signal producing means for reading out the data from said image memory and converting said data to a video signal indicative of the illumination pattern; and
    light irradiating means for projecting the light of the illumination pattern represented by said video signal onto an object, said irradiating means including a lens through which said light passes.

2. An illumination system according to claim 1, further comprising:
    image pickup means for picking up the image of the object; and
    image processing means for executing a predetermined process to the image data picked up and producing the data which is stored into said image memory.

3. An illumination system according to claim 1, further comprising means for moving a predetermined data of said image memory in the image memory to cause the illumination light to be scanned.

4. An illumination system according to claim 1, further comprising image pickup means for picking up the image of the object.

5. An illumination system according to claim 4 further comprising synchronizing control means for allowing the operations of said light irradiating means and said image pickup means to be synchronized with each other.

6. An illumination system according to claim 4, further comprising means for deflecting at least one of the light projected from said light irradiating means and light received by said image pickup means in order to make the optical axes of said light irradiating means and said image pickup means coincident at a location near the object.

7. An illumination system according to claim 4, further comprising:
    filtering means having a plurality of filters for allowing lights of a plurality of different colors to pass, said filters moving in front of said light irradiating means; and
    means for controlling said image pickup means so as to pick up the image of the object synchronously with the movement to said filters and synthesizing a plurality of image data obtained.

8. A digital control color illumination system comprising:
    an image memory for storing data regarding illumination patterns of color components of a plurality of different colors;
    video signal producing means for producing a video signal indicative of the illumination pattern of each color component on the basis of the data read out from said image memory and then outputting said video signal; and
    light irradiating means for projecting the light of said illumination pattern for each color component which is represented by said video signal onto an object, said irradiating means including a lens through which said light passes.

9. A color illumination system according to claim 8, further comprising image pickup means for picking up the image of the object.

10. A color illumination system according to claim 8, further comprising:
    a plurality of light irradiating means for projecting a plurality of lights corresponding to the illumination patterns of the colors for a plurality of different color components; and
    means for deflecting at least one of said plurality of projection lights in order to make the optical axes of the projected lights from said plurality of light irradiating means coincident at a location near the object.

* * * * *